(12) United States Patent
Präcklein et al.

(10) Patent No.: US 7,809,231 B2
(45) Date of Patent: Oct. 5, 2010

(54) APPARATUS AND METHOD FOR PROCESSING AT LEAST ONE OPTICAL WAVEGUIDE

(75) Inventors: Doris Präcklein, Unterhaching (DE); Timo Hafner, Gussenstadt (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 12/392,257

(22) Filed: Feb. 25, 2009

(65) Prior Publication Data

US 2009/0220203 A1 Sep. 3, 2009

(30) Foreign Application Priority Data

Feb. 29, 2008 (DE) .................. 20 2008 002 887 U (51) Int. Cl.
G02B 6/00 (2006.01)

(52) U.S. Cl. ...................................... 385/134

(58) Field of Classification Search ......... 385/134–140; 225/2, 96, 96.5, 103–105
See application file for complete search history.

(56) References Cited

U.S. PATENT DOCUMENTS 4,674,666 A * 6/1987 Balyasny ..................... 225/96
5,104,021 A * 4/1992 Seike et al. .................... 225/2
6,598,774 B2 * 7/2003 Kazama et al. ............. 225/100
7,070,078 B2 * 7/2006 Song ........................... 225/105
7,391,951 B2 * 6/2008 Hayashi et al. ............. 385/134
2006/0201982 A1* 9/2006 Yazaki et al. .................. 225/1
2006/0263028 A1* 11/2006 Honma ....................... 385/134
2008/0310812 A1* 12/2008 Watte et al. ................. 385/137

FOREIGN PATENT DOCUMENTS

| DE | 2757078 | 9/1978 |
| DE | 19903569 | 8/2000 |
| DE | 10137227 | 4/2003 |
| GB | 2308361 | 6/1997 |

* cited by examiner

*Primary Examiner*—Charlie Peng
(74) *Attorney, Agent, or Firm*—C. Paul Lewallen (57) ABSTRACT

An apparatus for processing at least one optical waveguide comprises a base and a movable part, the movable part being movable with respect to the base. The apparatus comprises a lever, the lever being attached to the base and comprising a notch for holding a cleaved-off part of the at least one optical waveguide. The apparatus comprises a link, one end of which is adapted to be coupled to the lever and an other end of which coupled to the movable part. The cleaved-off part is moved transversely with respect to the longitudinal direction of the at least one optical waveguide by the lever in response to a movement of the movable part.

30 Claims, 7 Drawing Sheets

APPARATUS AND METHOD FOR PROCESSING AT LEAST ONE OPTICAL WAVEGUIDE

RELATED APPLICATIONS

This application claims priority to German Application No. DE202008002887.6, filed Feb. 29, 2008, the entirety of which is incorporated herein by reference.

FIELD

The disclosure relates to an apparatus for processing at least one optical waveguide, an apparatus for cleaving at least one optical waveguide as well as a method for processing at least one optical waveguide.

TECHNICAL BACKGROUND

Optical waveguides can be cut by scratching them at a cutting point, after which they are broken by bending them at this point. Conventional cutters for optical waveguides have a base plate. The base plate comprises a cutting blade. A clamping arm is fitted to the baseplate. The clamping arm comprises an anvil which can be pressed onto the optical waveguide from above. Furthermore, the cutter has clamping arrangements which are mounted both on the clamping arm and on the baseplate.

In order to cut the optical waveguide, the optical waveguide is inserted in the cutter, is held firmly in the cutter by the clamping jaws, by a movement of the clamping arm, and is scratched by the cutting blade at the point where the optical waveguide is intended to be cut. Pressure is then exerted on the scratched point by the anvil, so that the optical waveguide breaks.

In conventional cutters, the cleaved-off parts of the optical waveguide fall into the surrounding and must be collected manually.

It is desired to provide an apparatus for processing at least one optical waveguide, an apparatus for cleaving at least one optical waveguide as well as a method for processing at least one optical waveguide which are easy to operate.

SUMMARY

An apparatus for processing at least one optical waveguide comprises a base. The apparatus further comprises a movable part. The movable part is movable with respect to the base with respect to a rotation axis. The rotation axis is fixed relative to the base. The apparatus comprises a lever. The lever is attached to the base and comprises a notch for holding a cleaved-off part of the at least one optical waveguide and is moveable with respect to the base. The apparatus comprises a link. One end of the link is adapted to be coupled to the lever and another end of the link is coupled to the movable part. In response to a movement of the movable part, the lever moves the cleaved-off part transversely with respect to the longitudinal direction of the at least one optical waveguide in response to a movement of the movable part.

In one embodiment, the apparatus comprises a container which is disposed adjacent to the lever and adapted to hold the cleaved-off part of the at least one optical waveguide.

The apparatus may comprise a cover which is disposed on the container and, in a first position, covers an opening of the container in order to hold the cleaved-off part of the at least one optical waveguide such that the cleaved-off part is prevented from falling out of the container and, in a second position, releases the opening. The apparatus may comprise a connection which is coupled to the cover and to the lever respectively. The connection may be adapted to convert a movement of the lever to a movement of the cover. The container may be releasably coupled to the apparatus.

The apparatus may comprise a coupling for coupling the apparatus to a cleaver to cleave the at least one optical waveguide.

In an embodiment, the link comprises a hook. The hook may be attached to the movable part and may be moveable with respect to a further rotation axis. The further rotation axis may be fixed relative to the movable part. In a state in which the hook engages on the lever, the lever may move the cleaved-off part in response to a movement of the hook.

The hook may comprise a projecting part which is in contact with the lever in the engaged state and slides on a sliding surface of the lever when the movable part is moved. The lever may be rotatable with respect to the movable part with respect to a yet further axis which is fixed relative to the base.

The apparatus may comprise a mechanism to reset the lever by a resetting force, one end of the mechanism being attached to the base, and an other end being attached to the lever. The lever may comprise a first position to hold the cleaved-off part of the at least one optical waveguide and a second position. The hook may engage with the lever in the first position. The lever moves from the first position to the second position by the projecting part sliding on the sliding surface in response to a movement of the movable part. In the second position, the lever may be decoupled. The mechanisms may cause a movement of the lever from the second position to the first position.

In an embodiment, the link comprises at least one connection rod which is coupled to the lever and can be moved relative to the base. The link may comprise a latch, the latch may be coupled to the at least one connection rod. The link further may comprise a hook which is coupled to the movable part. In a state in which the hook engages on the latch, the hook moves the latch in response to a movement of the movable part.

The hook may be rotatable with respect to the rotation axis with respect to the base. The hook may comprise a sliding surface. The latch may slide on the sliding surface in response to a movement of the movable part.

The apparatus may comprise a mechanism for resetting the at least one connection rod by a resetting force, one end of the mechanism being attached to the base, and an other end being attached to the at least one connection rod.

In another embodiment, the link comprises a first gearwheel which is rotatable with respect to the base with respect to the rotation axis. The first gearwheel is coupled to the movable part. The link may comprise a second gearwheel, the second gearwheel may be coupled to the lever. The link may comprise a mechanical transmitter, which may be coupled to the first gearwheel and to the second gearwheel to convert a rotary movement of the first gearwheel to a rotary movement of the second gearwheel.

The second gearwheel may be coupled to the lever by a clutch member. The clutch member may be adapted to convert a rotary movement of the second gearwheel in one direction to a rotary movement of the lever. The clutch member may be adapted to let pass a further rotary movement, in another direction, of the second gearwheel with respect to the lever.

The lever and the second gearwheel may be rotatable with respect to a further rotation axis which is fixed with respect to the base.

In a further embodiment, the link comprises a slotted-link guide. The slotted-link guide may comprise a groove and may be arranged on the movable part. The link may comprise a rod. One end of the rod may be coupled to the lever and an other end of the rod may be coupled to the groove.

The lever may comprise a recess. The recess may be coupled to the notch such that the cleaved-off part can get from the notch into the recess. The rod may comprise a projecting part, which may be coupled to the groove.

The apparatus may comprise a cover which is disposed on the container and, in a first position, covers an opening of the container in order to hold the cleaved-off part of the at least one optical waveguide such that the cleaved-off part is prevented from falling out of the container and, in a second position, releases the opening. The cover may be coupled to the rod.

An apparatus for cleaving at least one optical waveguide comprises a base and a movable part. The movable part is movable with respect to a rotation axis, which is fixed relative to the base. The movable part is movable to clamp the at least one optical waveguide between the base and the moving part. The apparatus comprises a lever, which is attached to the base and comprises a notch for holding a cleaved-off part of the at least one optical waveguide and being moveable with respect to the base. The apparatus comprises a link. One end of the link is adapted to be coupled to the lever and an other end of the link is coupled to the movable part. The lever moves the cleaved-off part transversely with respect to the longitudinal direction of the cleaved-off part in response to a movement of the movable part.

The base may comprise a blade for scratching the at least one optical waveguide and clamping jaws, and the movable part comprises an anvil and at least one further clamping jaw.

A method for processing at least one optical waveguide, comprises providing a cleaved-off part of the at least one optical waveguide in a notch of a lever. The lever is moved and thus, the cleaved-off part of the at least one optical waveguide is moved transversely with respect to the longitudinal direction of the cleaved-off part into a container. The container is disposed adjacent to the lever.

In an embodiment, the method comprises moving a cover which is disposed on the container. The moving of the cover may be caused by the moving of the lever, the cover being disposed on the container.

The method may comprise engaging of a projecting part on a hook behind the lever. The projecting part may slide along a sliding surface on the lever. The projecting part and the sliding surface may decouple and the lever may be reset.

In an embodiment, the method comprises engaging of a hook behind a latch. The latch may slide along a sliding surface of the hook. At least one connection rod may be moved in the direction of the lever by the latch. The latch and the sliding surface of the hook may decouple and the at least one connection rod and the latch may be reset respectively.

In an embodiment, the method comprises rotating a first gearwheel and transmitting of the rotation of the first gearwheel to a rotation of a second gearwheel.

In an embodiment, the method comprises moving the lever linear transversely with respect to the longitudinal direction of the optical waveguide.

In an embodiment, the method comprises inserting the at least one optical waveguide into the notch in the lever and cleaving the at least one optical waveguide such that the cleaved-off part of the at least one optical waveguide results in the notch of the lever.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION OF THE INVENTION

Reference will now be made in detail to the preferred embodiments of the present invention, examples of which are illustrated in the accompanying drawings. Whenever possible, like reference numbers will be used to refer to like components or parts.

Figure 1:
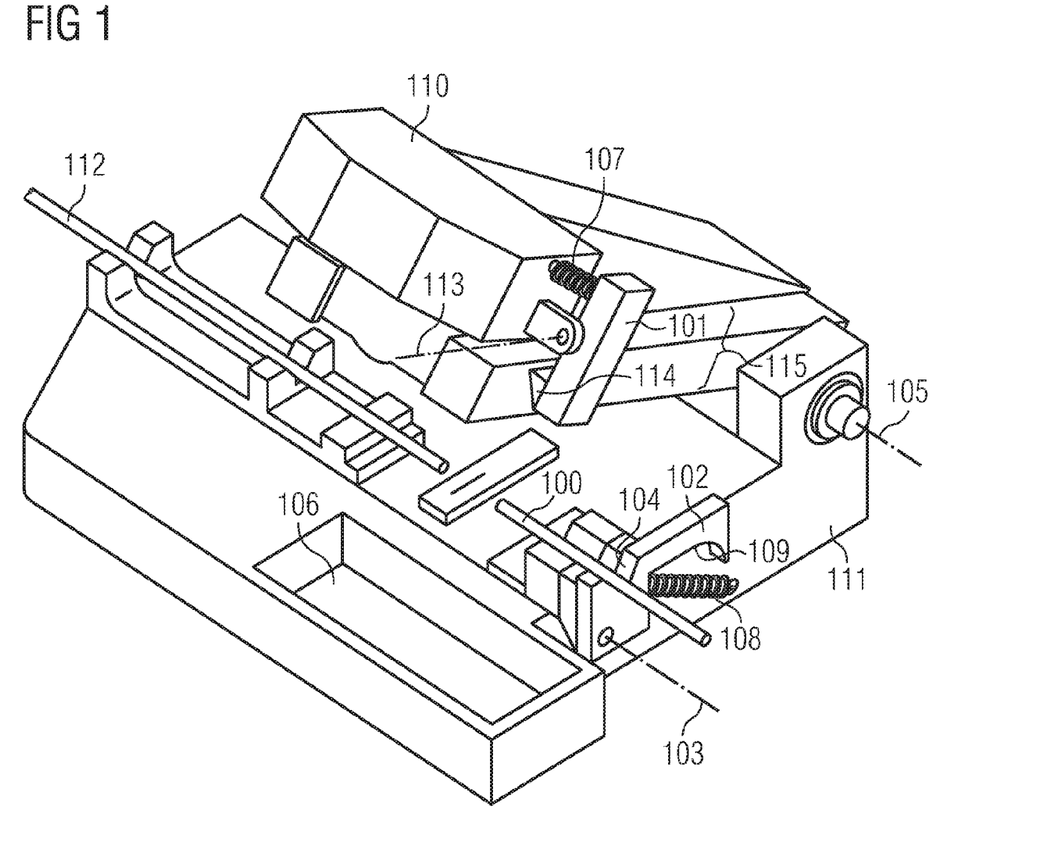
FIG. 1 schematically shows an apparatus for cleaving according to an embodiment, FIGS. 2A and 2B schematically show a side view of an apparatus for cleaving according to an embodiment, FIG. 3 schematically shows an apparatus for cleaving according to a further embodiment, FIG. 4 schematically shows an apparatus for cleaving according to another embodiment, and FIG. 5 schematically shows an apparatus for cleaving according to yet another embodiment, FIG. 6 schematically shows an apparatus for processing an optical waveguide, FIG. 7 schematically shows a cleaver coupled with an apparatus for processing an optical waveguide.

FIG. 1 shows an apparatus (not numbered) having a base 111, a movable part 110, an optical waveguide 112 disposed in the apparatus, a cleaved-off part 100 of the optical waveguide, a hook 101 and a lever 102, as well as a container 106. The figure also shows rotation axes 103, 105 and 113, as well as resetting mechanisms 107 and 108.

The base has elements for holding the optical waveguide to be cut. Furthermore, the base has rotating joints which allow the movement of the base and the movable part to be coupled. The rotating joints are arranged in an edge area of the base. A lever force can therefore be produced by the base and the movable part, by means of which the at least one optical waveguide can be cut. An embodiment of the base has a stand surface which is flat, by means of which it can be positioned on a surface.

Further elements for cutting an optical waveguide may be arranged on the base, for example an anvil or a blade for scratching the at least one optical waveguide. The base may have clamping jaws for fixing the optical waveguide during the cutting process.

The container 106 may be part of the base 111, as shown in the figure. However, the container may also be separate and may be releasably coupled to the base, for example by means of a plug connection.

The lever 102 which is arranged on the base has a notch 104. For example, together with the elements for holding the optical waveguide to be cut, the notch 104 can be used to align the at least one optical waveguide within the apparatus before and/or during the cutting process.

The lever 102 comprises a sliding surface 109, which is arranged on a side of the lever 102 opposite the notch. The lever 102 can be rotated with respect to the rotation axis 103. The rotation axis 103 is fixed relative to the base 111. The lever 102 can be rotated with respect to the base 111. A cleaved-off part 100 of the optical waveguide 112 which is disposed in the notch 104 can be moved into the container 106 by rotation of the lever 102 around the rotation axis with respect to the base 111.

The resetting mechanism 108 can be used to move the lever back to the illustrated initial position again, after a movement. One end of the resetting mechanism 108 is coupled to the lever 102, and its other end is coupled to the base 111. The resetting mechanism 108 is adapted to move the lever 102 back to its initial position, for example by the force of a spring.

The base 111 and the movable part 110 are coupled on the rotation axis 105 by means of the rotating joints of the base. The movable part 110 can be rotated with respect to this axis with respect to the base 111. The movable part 110 may have elements for cutting an optical waveguide, for example a cutting blade or an anvil. The movable part may have clamping jaws for fixing the at least one optical waveguide.

The hook 101 is disposed on the movable part. The hook and the movable part 110 may be coupled to one another by a rotating joint, or some other connection. The rotation axis 113 passes through the rotating joint and the hook 110 can rotate around it with respect to the movable part 110.

The rotation axes 103 and 105 are arranged parallel to one another and generally parallel to the longitudinal direction of the optical waveguide 112. The rotation axis 113 may be arranged essentially transversely with respect to the rotation axes 103 and 105 and the longitudinal direction of the optical waveguide 112.

The hook 101 comprises a projecting part, for example, a tab 114. The hook 101 and the tab 114 are parts of a link 115 for a coupling to the lever 102. When the movable part 110 has been moved in the direction of the base, the tab 114 may engage behind the lever 102 so that the tab 114 and the sliding surface 109 of the lever make contact with one another. When the movable part 110 is moved away from the base 111, the tab 114 can slide along the sliding surface 109 on the lever 102, thus moving the lever 102 with it. The lever 102 is thus rotated around the axis 103.

The sliding surface 109 may have a shape which comprises a flat section and a curved section. In an embodiment, the curved section is in the form of a circle segment, but may also have a different shape, for example being oval. The movement of the lever can be influenced by the shape of the sliding surface 109. In the flat section, the movement of the tab is transmitted linearly to the lever, while it is accelerated in the curved section.

If the movable part 110 is moved further away from the base 111, the tab 114 and the sliding surface 109 of the lever 102 decouple. The lever 102 can be moved back to the illustrated initial position again. The hook 101 comprises the resetting mechanism 107, which moves the hook 101 back to the illustrated initial position again after deflection. For example, the resetting mechanism 107 may comprise a spring, and the hook 101 may be moved back by the force of this spring.

The container 106 is arranged on the base 111 such that it can hold cleaved-off parts 100 of the at least one optical waveguide 112, which parts 100 are moved by the lever. For example, it is arranged essentially parallel to the longitudinal direction of the optical waveguide on the apparatus. The container can hold a plurality of cleaved-off parts 100 of optical waveguides 112 and can collect cleaved-off parts 100 of optical waveguides 112 from a plurality of cutting processes. The container may have any suitable shape such as a cuboid, or other shape such as cylindrical, rectangular, etc.

The arrangement of the container 106 essentially parallel to the longitudinal direction of the at least one optical waveguide results in the end of the at least one optical waveguide being accessible. This allows the position of the at least one optical waveguide in the apparatus to be changed after insertion but before cutting, in order for example to arrange optical waveguides as parallel as possible. Furthermore, the length of the cleaved-off part of the at least one optical waveguide can be varied over a specific range, for example as a function of the size of the container.

Figure 2A:
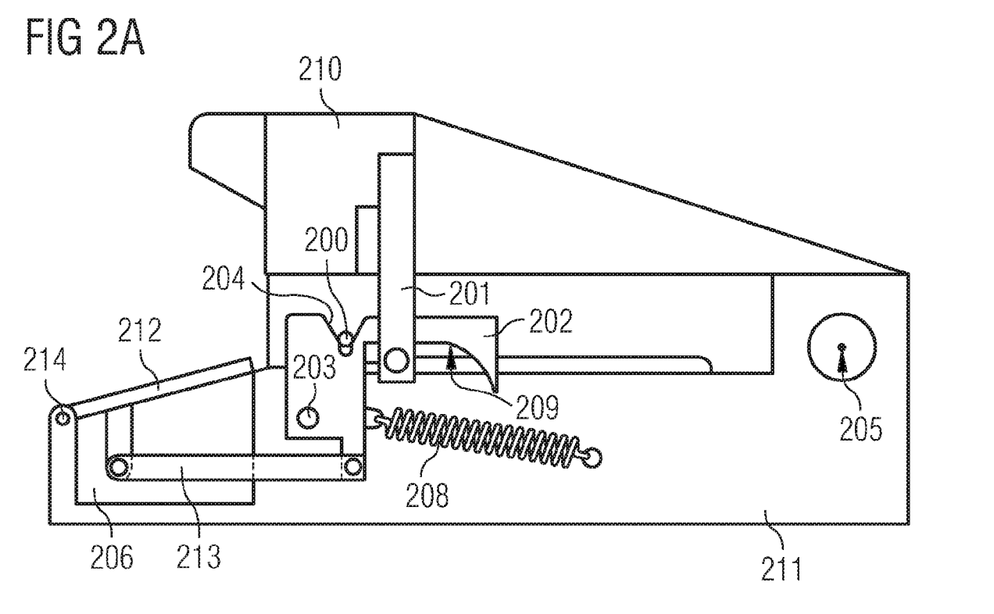
Figure 2B:
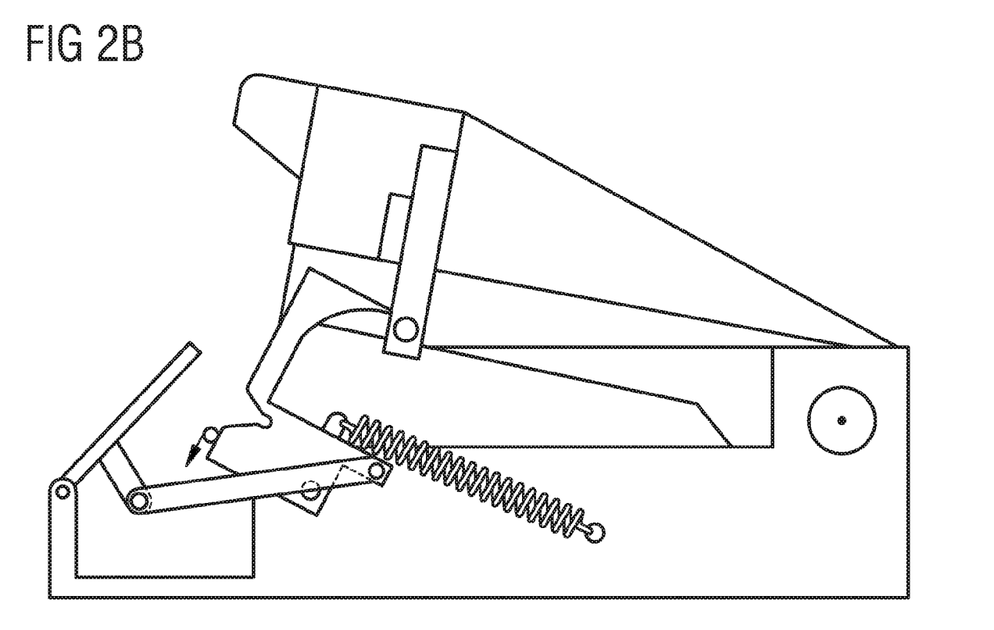

FIGS. 2A and 2B show an apparatus (not numbered) having a base 211, a movable part 210, a hook 201, a lever 202, a container 206, a cover 212 for the container, a connection member 213 between the lever and the cover, and an optical waveguide 200 disposed in the apparatus.

FIG. 2A shows the base 211 and the movable part 210 in a position after the optical waveguide 200 has been cleaved. The movable part 210 has a joint for a coupling to the base 211, so that the movable part 210 can be rotated around a rotation axis 205. The rotation axis 205 is defined relative to the base. The hook 201 is attached to the movable part 210 such that it can move with respect to the base 211.

The lever 202 is connected to the base 211 and can rotate around a rotation axis 203 which is fixed relative to the base. The lever 202 has a sliding surface 209 and a notch 204. The cleaved-off part of the optical waveguide 200 is held in the notch. The hook 201 engages behind the lever 202, so that the hook 201 makes contact with the sliding surface 209.

The connection member 213 is coupled to the lever 202 and is also coupled to the cover 212. One end of the connection member 213 may rotate with the cover 212, and the other end is coupled to the lever 202, for example by joints. The connection member 213 may be a straight rod, although it may also be curved. In an embodiment, the connection member 213 is formed integrally, but it may also be formed from two or more parts. It may have joints in order to couple the plurality of parts to one another. The connection member 213 is suitable for converting a movement of the lever 202 to a movement of the cover 212 with respect to the base 211, so that the cover is opened and closed.

The cover 212 is connected via a rotation axis 214 to the container 206, and in another embodiment the cover is coupled to the base. The cover 212 may have a joint for this purpose, and covers an opening for holding optical waveguides. The cover 212 can be moved via the connection member to an open position, so that the container can receive optical waveguides. In the illustrated position, the cover prevents cleaved-off parts of the at least one optical waveguide from accidentally fall out of the container.

The cover may be larger than the opening in the container, and may overlap it. It can close the container so that no cleaved-off parts of the at least one optical waveguide can escape from the container when the apparatus is moved, for example when it is turned over.

In order to move the cleaved-off part of the at least one optical waveguide 200 into the container, the lever 202 is driven by the hook 201 when the movable part 210 is moved away from the base 211. During this operation, the hook 201 moves along the sliding surface 209 of the lever 202, and the lever 202 describes a circular path.

FIG. 2B shows the apparatus from FIG. 2A in a position in which the movable part 210 has been moved away from the base 211. The hook 201 has moved the lever 202 upwards to the illustrated position by sliding on the sliding surface 209, so that the cleaved-off part of the optical waveguide 200 falls into the container 206. In other words, the movement of the lever has opened the cover 212 of the container 206. The connection member 213 has converted the movement of the lever 202 to a movement of the cover 212.

When the movable part 210 is moved further away from the base 211, the hook 201 and the lever 202 are decoupled. The lever 202 can then be moved back to the original position as shown in FIG. 2A, by a resetting mechanism 208. The cover 212 may be likewise moved back to the position shown in FIG. 2A, in order to close the container 206. The movement of the cover 212 can be produced by the connection member 213 from the movement of the lever. The cover 212 then once again covers the opening for holding optical waveguides, and largely prevents the cleaved-off parts of the at least one optical waveguide from accidentally escape from the container 206.

Since the cleaved-off parts of the optical waveguides are transported to the container after the cutting process, the cleaved-off parts of the optical waveguides need not be collected manually, thus reducing the risk of injuries to the operator by parts of the optical waveguides, and saving time. Simply stated, the sharp cut-off ends of the optical fibers are neatly disposed of, thereby avoiding injury to the craftsman when cleaning-up.

Figure 3:
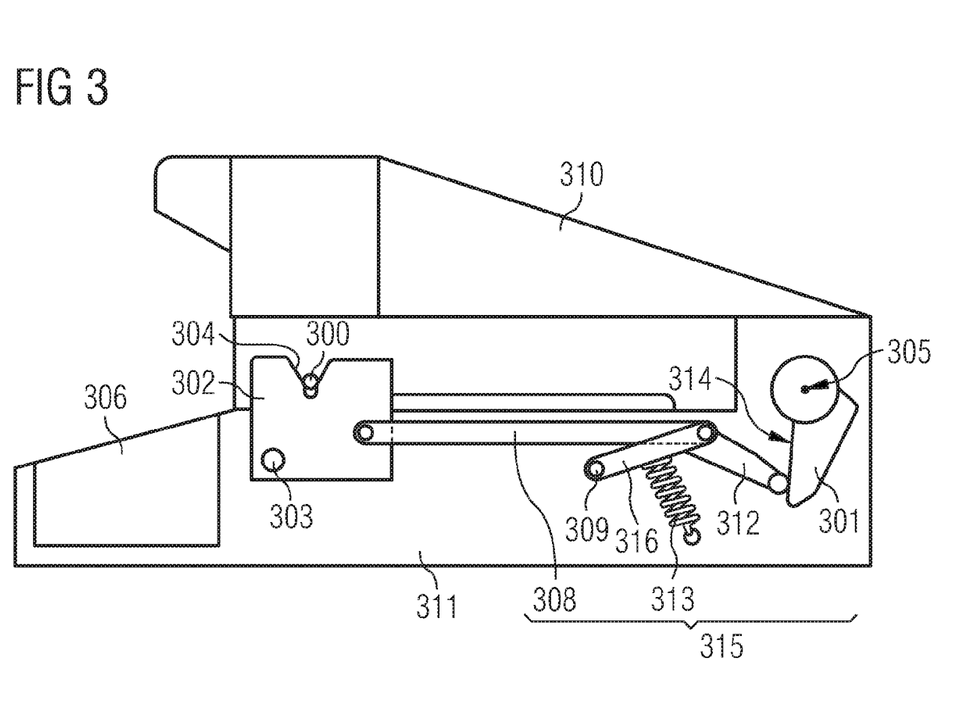

FIG. 3 shows a base 311, a movable part 310, a cleaved-off part 300 of an optical waveguide, a hook 301, a lever 302, a rotation axis 303, a notch 304, a further rotation axis 305, a container 306, a connection rod 308, yet another rotation axis 309, a latch 312, a resetting mechanism 313 and a sliding surface 314.

The movable part 310 and the base 311 are coupled via a joint, so that the movable part can be moved around the rotation axis 305. The lever 302 is coupled to the base 311 and can rotate with respect to the rotation axis 303. The hook 301 can be moved around the rotation axis 305 and is coupled to the movable part 310 so that the hook 301 is moved when the movable part 310 is moved. The hook has a sliding surface 314. The hook 301 may comprise elastic material, for example an elastic plastic. The hook 301 is coupled to the latch 312 when the movable part 310 is moved in the direction of the base 311 in order to cut an optical waveguide. The hook 301 is moved beyond the latch 312, so that the sliding surface 314 of the hook 301 makes contact with the latch 312 once the optical waveguide has been cut. The elastic material allows the hook 301 to flex when it passes over the latch 312.

A link 315 is disposed on the base 311, between the lever 302 and the hook 301. The connection rod 308, the latch 312 and the hook 301 are parts of the link 315. One end of the connection rod 308 is coupled to the lever 302, and its other end is coupled to the latch 312. The latch 312 makes contact with the sliding surface 314 on the hook 301. The latch 312 and the at least one connection rod 308 can be moved around the axis 309 by movement of the hook 301 with respect to the base 311. This movement of the connection rod 308 results in the lever 302 being rotated around the axis 303 with respect to the base 311 and the cleaved-off part of the at least one optical waveguide 300 can be tilted from the notch 304 into the container 306.

The connection between the hook 301 and the lever 302 in the illustrated exemplary embodiment comprises the latch 312, which is coupled to the connection rod 308. One end of the latch 312 can slide on the sliding surface 314 on the hook 301. The other end may be coupled to the connection rod 308. The connection rod 308 is coupled via a further rod 316 to the rotation axis 309. In the illustrated exemplary embodiment, the resetting mechanism 313 is attached to this further rod 316, and its other end is coupled to the base 311. The resetting mechanism 313 can move the coupling mechanism and therefore the lever 302 back to the illustrated initial position once a cleaved-off part of an optical waveguide has been moved out of the lever 302 into the container 306.

Particularly when the hook 301 is not composed of elastic material, a further resetting mechanism may be arranged on the hook. The hook is then arranged on the axis 305 such that it can move relative to the movable part, and is moved back to its initial position after deflection by the resetting mechanism.

As explained with respect to FIG. 2, a cover may be arranged on the container 306. The cover may be coupled to the lever via a connection element. For example, the cover covers an opening in the container for holding optical waveguides. The cover can be moved to an open position via the connection element, so that the container can receive optical waveguides.

Figure 4:
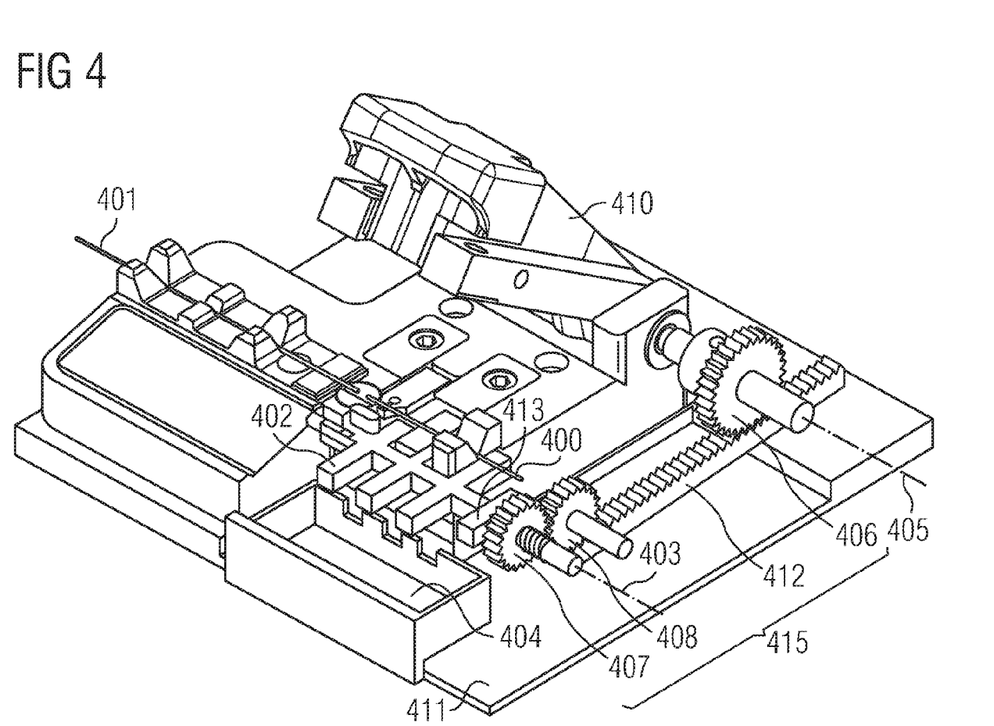

FIG. 4 shows an apparatus (not numbered) having a base 411, a movable part 410, an optical waveguide 401 disposed in the apparatus, a cleaved-off part 400 of the optical waveguide, a lever 402, a container 404, a first gearwheel 406, a second gearwheel 407, a third gearwheel 408, a mechanical transmitter 412, a clutch member 413 and rotating shafts 403 and 405.

In one area, the base 411 has holders for a shaft of a rotating joint. The base is coupled to the movable part 410 via this shaft of the rotating joint. The coupling comprises the rotating shaft 405.

The lever 402 can be moved around the axis 403. The axes 405 and 403 are essentially parallel to one another. The container 404 is arranged adjacent to the lever 402. The container is in the form of a drawer.

A link 415 can convert a movement of the movable part 410 to a rotary movement of the lever 402. The cleaved-off part of the at least one optical waveguide can therefore be moved into the container 404.

In the illustrated embodiment, the link 415 comprises the first gearwheel 406, the second gearwheel 407, the third gearwheel 408 and the mechanical transmitter 412.

The first gearwheel 406 is coupled to the rotating shaft 405 and can rotate about it with respect to the base 411. The gearwheel 406 rotates when the movable part 410 is moved. The mechanical transmitter 412 which, in the illustrated exemplary embodiment, is a toothed rod, transmits the movement of the gearwheel 406 in the direction of the lever 402. The movement of the mechanical transmitter 412 is passed on to the gearwheel 408, which is coupled to the mechanical transmitter 412.

The second gearwheel 407 is coupled to the gearwheel 408 and is in turn coupled to the lever 402. The lever 402 can therefore be moved by a movement of the gearwheel 407, which is in turn driven by the gearwheel 408, which is in turn driven by the toothed rod 412, which is in turn driven by the gearwheel 406. The rotation axes of the gearwheels are in each case essentially parallel to one another, and the movement of the mechanical transmitter, in particular of the toothed rod, runs transversely with respect to them.

The coupling between the gearwheel 407 and the lever 402 may comprise the clutch member 413. The clutch member is designed to convert only rotation of the gearwheel in one direction to movement of the lever. Further movement of the gearwheel in another direction is not transmitted by the clutch member to the lever. In consequence, only a movement of the movable part 410 away from the base 411 is converted to a movement of the lever 402. The lever moves once the optical waveguide 400 has been cut. The clutch member of a further exemplary embodiment is arranged between the movable part 410 and the first gearwheel 406.

In other embodiments, the link may also comprise two gearwheels, and it may also comprise more gearwheels, for example four gearwheels. The gearwheels may also be half gearwheels. The mechanical transmitter may be a belt or else may be in some other form, in particular with parts of the link having sufficiently high friction between them to transmit movements to one another.

Figure 5:
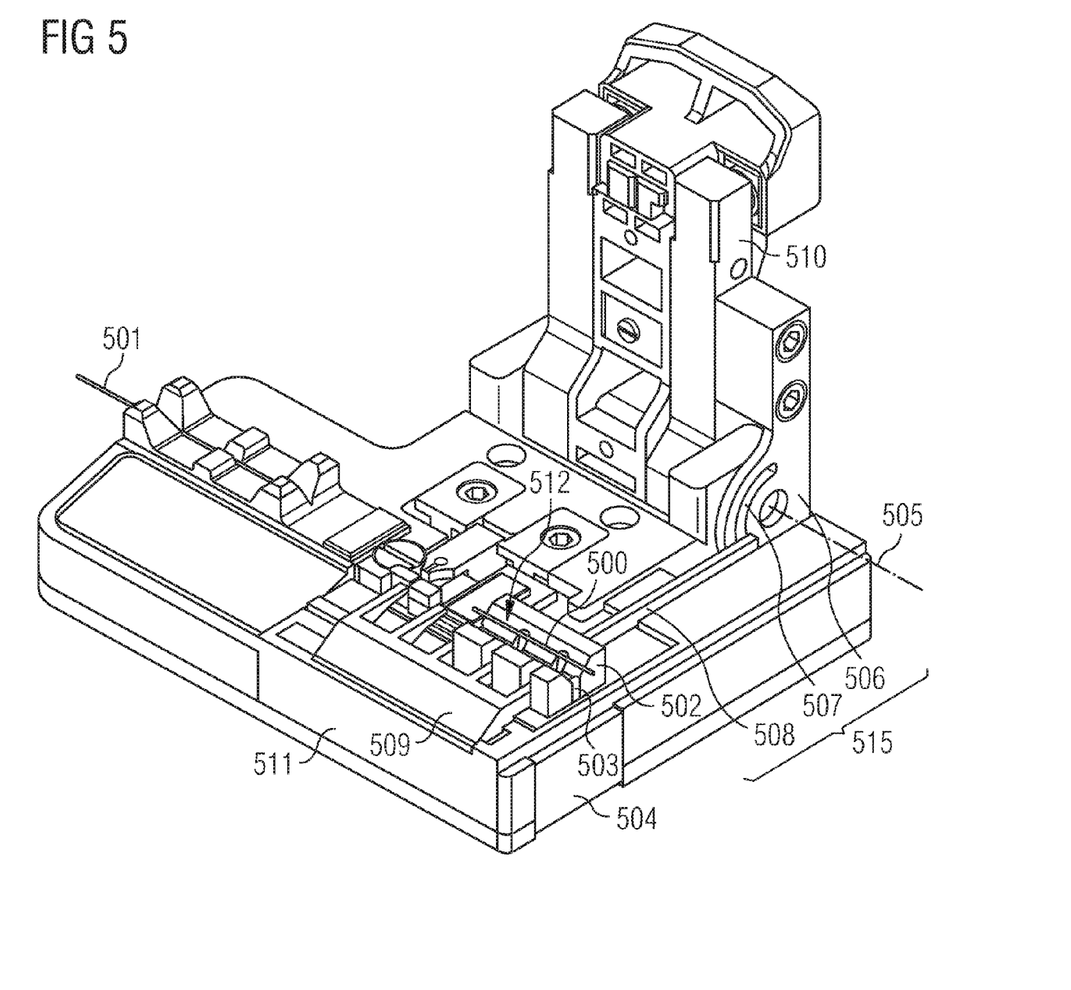

FIG. 5 shows another apparatus (not numbered) having a movable part 510, a base 511, an optical waveguide 501 disposed in the apparatus, a cleaved-off part 500 of the optical waveguide, a lever 502, a recess 503, a container 504, a rotation axis 505, a slotted-link guide 506, a groove 507, a connection rod 508, a cover 509 and a notch 512.

The movable part 510 and the base 511 are coupled to one another on the rotating shaft 505. The slotted-link guide 506 is disposed on the movable part 510, adjacent to the rotational shaft 505. The slotted-link guide 506 is part of a link 515.

The slotted-link guide 506 comprises the groove 507. The connection rod 508 is coupled to the groove and is in turn connected to the lever 502 and to the cover 509.

The lever 502 has the notch 512. The notch is part of a holding apparatus for the optical waveguide 501. Once the optical waveguide has been cut, the cleaved-off part 500 of the optical waveguide is located in the notch 512. The position of the lever in which the optical waveguide is inserted, and the position after cutting, in which the cleaved-off part 500 is fed from the lever to the container 504, are offset with respect to one another transversely with respect to the longitudinal direction of the optical waveguide. The lever can be moved between these two positions by the connection rod 508.

In the illustrated figure, the lever is located above the container 504, in particular above an opening in the container. The lever has the recess 503 between the opening and the notch 512, through which recess 503 the cleaved-off part 504 can fall out of the notch into the container 504.

When the lever is not located above the container, the opening of the container is closed by the cover 509. The cover is coupled to the lever 502 and to the connection rod 508. The cover is moved when the lever is moved. When the lever is in the position for holding an optical waveguide, the cover is located above the opening in the container and largely prevents the cleaved-off parts of optical waveguides from escaping from the container. When the lever is moved in the direction of the container in order to move a cleaved-off part into the container, the cover is likewise moved, and releases the opening in order to receive the cleaved-off part 500.

The connection rod 508 is coupled to the groove 507, for example via a projecting element. The groove 507 has an area in the form of a circular section, whose radius has an origin coinciding with the rotation axis 505. The groove has a further area in which the distance between the groove and the rotation axis 505 increases. When the coupling between the connection rod and the groove is located in this area, the rod is moved in the direction of the lever, and the lever is therefore moved.

Figure 6:
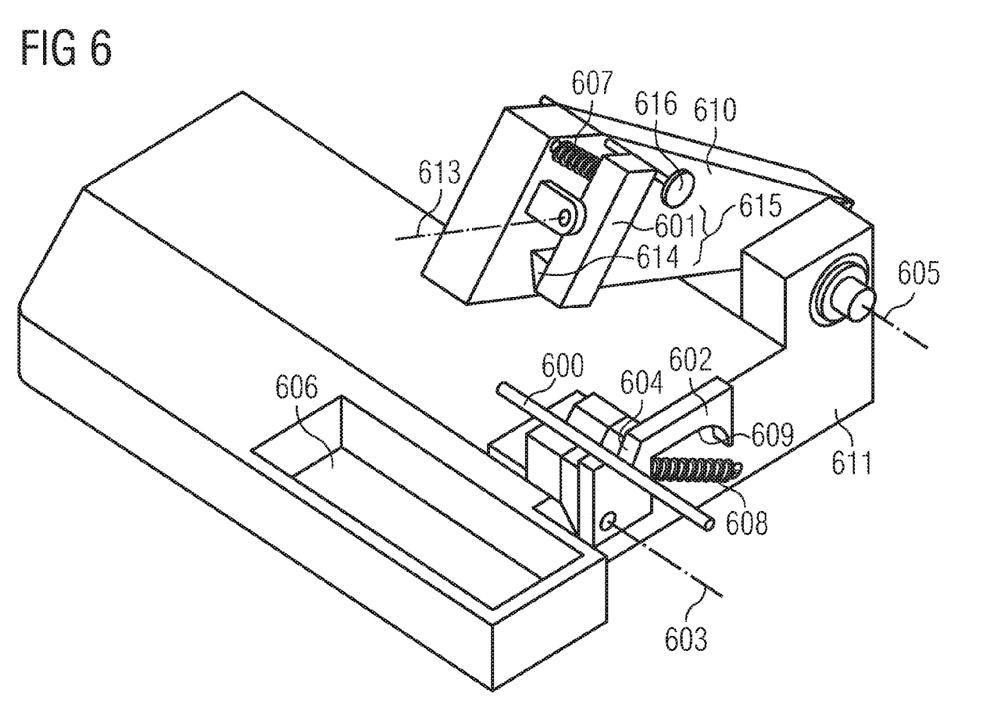

FIG. 6 shows an apparatus which can be docked to a conventional cleaver for optical waveguides. The apparatus comprises a base 611 and a moveable part 610. The moveable part 610 is moveable with respect to the base 611. The moveable part 610 is moveable with respect to a rotation axis 605. The rotation axis 605 is fixed relative to the base 611.

The apparatus comprises a coupling 616. The coupling 616 is disposed at the moveable part 610. The apparatus can be coupled with the cleaver by the coupling 610. For example, the coupling 616 comprises a screw. In a further embodiment, the coupling may comprise a clamp or any other member which is adapted to couple the apparatus to a cleaver.

The conventional cleaver comprises a clamping arm which is moved with respect to a base plate to cleave the optical waveguide. In an embodiment, an anvil is disposed on the clamping arm and a blade is disposed on the base plate of the cleaver. The optical waveguide may be scratched by the blade and may be cleaved by a pressure imposed by the anvil. For cleaving the optical waveguide, the clamping arm of the cleaver is moved toward the base plate of the cleaver. The conventional cleaver may be coupled to the apparatus such that the base plate is disposed on the base 611 of the apparatus. The clamping arm of the conventional cleaver may be disposed basically parallel to the movable part 610. After cleaving an optical waveguide with the cleaver, the cleaved-off part 600 resides in a notch 604 of a lever 602.

By coupling an apparatus as shown in FIG. 6 to a conventional cleaver, it is avoided that the cleaved-off parts of the optical waveguide fall into the environment and must be collected manually. The apparatus provides an automatic transport of a cleaved-off part 600 into a container 606. The moveable part 610 is coupled to the lever of the cleaver such that a movement of the lever of the cleaver results in a movement of the moveable part 610. When the clamping arm of the cleaver is moved towards the base 611, the coupling 616 causes a movement of the moveable part 610 toward the base 611. When the lever of the cleaver is moved away from the base 611 after cleaving, the coupling 616 causes a movement of the movable part 610 away from the base 611. The movement of the cleaved-off part 600 into the container 606 is caused by a movement of the clamping arm of the cleaver. The movement of the clamping arm of the cleaver is transferred into a movement of the cleaved-off part 600 by the coupling 616 and the lever 602.

In the embodiment shown in FIG. 6, the apparatus comprises a transport mechanism for the cleaved-off part 600 which operates as the mechanism described with respect to FIG. 1.

A link 615, which comprises a hook 601 with a tab 614, is disposed at the movable part 610. The hook is movable with respect to the movable part 610 with respect to an axis 613. A resetting mechanism 607 may be disposed to move the hook 601 back to the illustrated initial position after a deflection.

The lever 602 is arranged on the base 611. The lever 602 comprises the notch 604. The lever 602 comprises a sliding surface 609, which is arranged on a side of the lever 602 opposite the notch 604. The lever 602 can be rotated with respect to a rotation axis 603. The rotation axis 603 is fixed relative to the base 611. The cleaved-off part 600 of the optical waveguide which is disposed in the notch 604 can be moved into the container 606 by rotation of the lever 602 around the rotation axis with respect to the base 611. A resetting mechanism 608 may be arranged to move the lever back to the illustrated initial position again, after a displacement.

The container 606 may be releasably coupled with the base 611. It may comprise a cover. The cover may be moveable to close and open the container. In another embodiment, the cover is fixed to the container 606.

The apparatus may comprise a transport mechanism for the cleaved-off part which operates as the mechanism described with respect to FIG. 3. In this embodiment the apparatus comprises a link disposed on the base between a lever and a hook. A connection rod, the latch and the hook are parts of a link. The cleaved-off part is moved into the container by a rotary movement of the hook with respect to the base. The rotary movement is transferred by the latch to the connection rod and the lever.

In an other embodiment, the apparatus may comprise a transport mechanism for the cleaved-off part which operates as the mechanism described with respect to FIG. 4. A first gearwheel may be coupled to the movable part and may move together with the movable part with respect to the base. A mechanical transmitter converts the rotation of the first gearwheel to a rotary movement of a second gearwheel. The second gearwheel is coupled to a lever. The cleaved-off part is moved into the container by a rotary movement of the lever with respect to the base which is caused by the rotary movement of the second gearwheel.

In yet another embodiment, the apparatus may comprise a transport mechanism for the cleaved-off part which operates as the mechanism described with respect to FIG. 5. A slotted-link guide is disposed on the movable part. A connection rod is coupled to the slotted-link guide and the lever. To transport the cleaved-off part into the container, the lever is moved transversely with respect to the longitudinal direction of the optical waveguide. The movement of the lever is causes by a movement of the connection rod. The movement of the connection rod is caused by a movement of the movable part.

Figure 7:
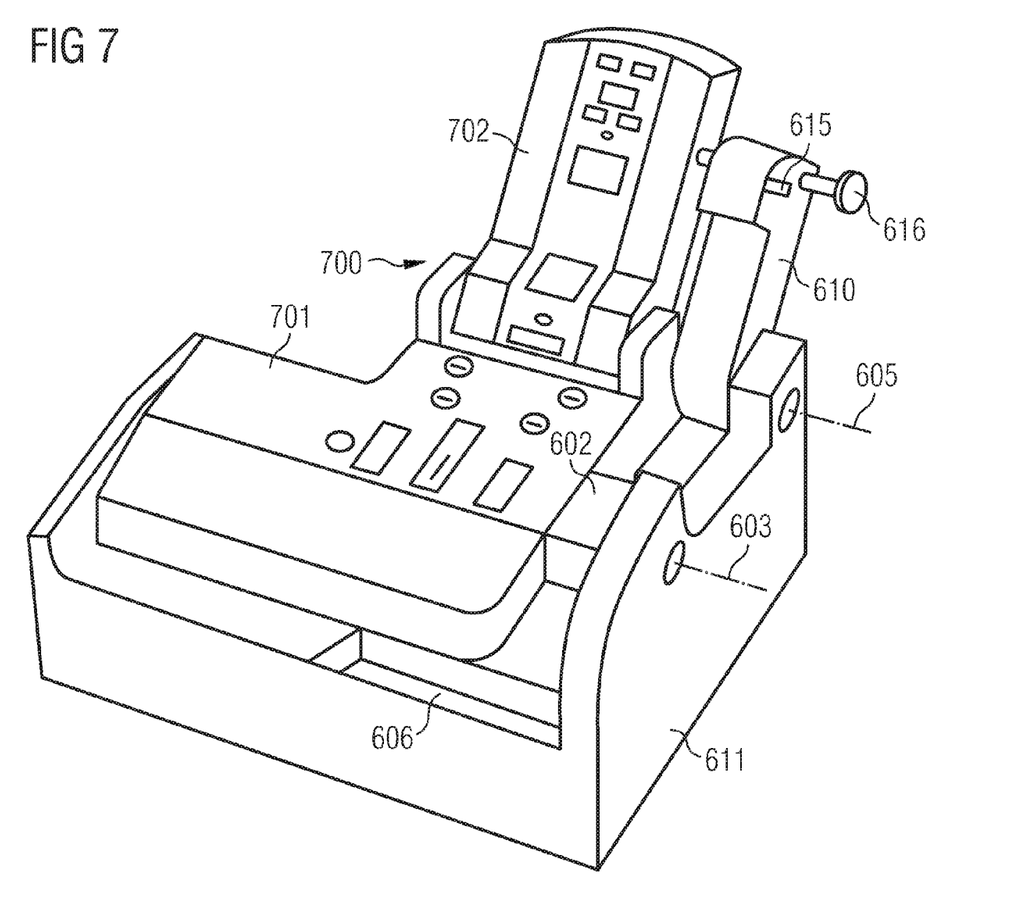

FIG. 7 shows the apparatus described with respect to FIG. 6. A cleaver 700 is coupled to the apparatus. A base plate 701 of cleaver 700 is disposed on the base 611 of the apparatus. A clamping arm 702 which is movable with respect to the base plate 701 is coupled to the movable part 610 by the coupling 616. To cleave the optical waveguide, the clamping arm 702 is moved towards the base plate 701. Due to the coupling 616, the movable part 610 moves together with the clamping arm 702. After the optical waveguide has been cleaved, the clamping arm 702 is moved in direction away from the base plate 701 in the direction of the shown position. The movement of the clamping arm 702 causes a movement of the movable part 610 in direction away from the base 611 in the direction of the shown position. During this movement, the cleaved-off part is transported into the container 606 due to a movement of the lever 602. The movement of the lever is caused by the movement of the movable part 610 in direction away from the base 611.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for processing at least one optical waveguide, comprising:
   a base;
   a movable part, the movable part being movable with respect to the base with respect to a rotation axis, the rotation axis being fixed relative to the base,
   a lever, the lever being attached to the base and comprising a notch for holding a cleaved-off part of the at least one optical waveguide and being moveable with respect to the base;
   a link, one end of which is adapted to be coupled to the lever and an other end of which coupled to the movable part, the lever moving the cleaved-off part transversely with respect to the longitudinal direction of the at least one optical waveguide, in response to a movement of the movable part.

2. The apparatus of claim 1, comprising a container which is disposed adjacent to the lever and adapted to hold the cleaved-off part of the at least one optical waveguide.

3. The apparatus of claim 2, comprising a cover which is disposed on the container and, in a first position, covers an opening of the container in order to hold the cleaved-off part of the at least one optical waveguide such that the cleaved-off part is prevented from falling out of the container and, in a second position, releases the opening.

4. The apparatus of claim 3, comprising a connection, which is coupled to the cover and to the lever respectively, and adapted to convert a movement of the lever to a movement of the cover.

5. The apparatus of claim 2, wherein the container is releasably coupled to the apparatus.

6. The apparatus of claim 1, comprising a coupling for coupling the apparatus to a cleaver to cleave the at least one optical waveguide.

7. The apparatus of claim 1, wherein the link comprises a hook, the hook being attached to the movable part and being moveable with respect to a further rotation axis and, in a state in which it engages on the lever, the lever moving the cleaved-off part, in response to a movement of the hook, the further rotation axis being fixed relative to the movable part.

8. The apparatus of claim 7, the hook comprising a projecting part which is in contact with the lever in the engaged state, and slides on a sliding surface of the lever when the movable part is moved.

9. The apparatus of claim 7, wherein the lever is rotatable with respect to the movable part with respect to a yet further axis which is fixed relative to the base.

10. The apparatus of claim 7, comprising a mechanism to reset the lever by a resetting force, one end of the mechanism being attached to the base, and an other end being attached to the lever.

11. The apparatus of claim 10, the lever comprising a first position to hold the cleaved-off part of the at least one optical waveguide and a second position, the hook engaging with the lever in the first position, wherein the lever moves from the first position to the second position by the projecting part sliding on the sliding surface in response to a movement of the movable part, and, in the second position, the lever is decoupled, wherein the mechanisms causes a movement of the lever from the second position to the first position.

12. The apparatus of claim 1, the link comprising:
   at least one connection rod which is coupled to the lever and is movable relative to the base;
   a latch, the latch being coupled to the at least one connection rod;
   a hook, which is coupled to the movable part and, in a state in which it engages on the latch, moves the latch in response to a movement of the movable part.

13. The apparatus of claim 12, wherein the hook is rotatable with respect to the rotation axis with respect to the base.

14. The apparatus of claim 13, wherein the hook comprises a sliding surface, and the latch slides on the sliding surface in response to a movement of the movable part.

15. The apparatus of claim 13, comprising a mechanism for resetting the at least one connection rod by a resetting force, one end of the mechanism being attached to the base, and an other end being attached to the at least one connection rod.

16. The apparatus of claim 1, the link comprising:
   a first gearwheel which is rotatable with respect to the base with respect to the rotation axis and coupled to the movable part;
   a second gearwheel, the second gearwheel being coupled to the lever;
   a mechanical transmitter, the mechanical transmitter being coupled to the first gearwheel and to the second gearwheel to convert a rotary movement of the first gearwheel to a rotary movement of the second gearwheel.

17. The apparatus of claim 16, wherein the second gearwheel is coupled to the lever by a clutch member, the clutch member being adapted to convert a rotary movement of the second gearwheel in one direction to a rotary movement of the lever, and let pass a further rotary movement, in another direction, of the second gearwheel with respect to the lever.

18. The apparatus of claim 16, wherein the lever and the second gearwheel are rotatable with respect to a further rotation axis which is fixed with respect to the base.

19. The apparatus of claim 1, the link comprising:
a slotted-link guide, the slotted-link guide comprising a groove and being arranged on the movable part;
a rod, one end the rod being coupled to the lever and an other end of the rod being coupled to the groove.

20. The apparatus of claim 19, wherein the lever comprises a recess, the recess being coupled to the notch such that the cleaved-off part can get from the notch into the recess.

21. The apparatus of claim 19, wherein the rod comprises a projecting part, the projecting part being coupled to the groove.

22. The apparatus of claim 19, comprising a cover which is disposed on the container and, in a first position, covers an opening of the container in order to hold the cleaved-off part of the at least one optical waveguide such that the cleaved-off part is prevented from falling out of the container and, in a second position, releases the opening, with the cover being coupled to the rod.

23. An apparatus for cleaving at least one optical waveguide, comprising:
a base;
a movable part, the movable part being movable with respect to a rotation axis, the'rotation axis being fixed relative to the base, to clamp the at least one optical waveguide between the base and the moving part,
a lever, the lever being attached to the base and comprising a notch for holding a cleaved-off part of the at least one optical waveguide and being moveable with respect to the base;
a link, one end of which is adapted to be coupled to the lever and an other end of which coupled to the movable part, with the lever moving the cleaved-off part transversely with respect to the longitudinal direction of the cleaved-off part in response to a movement of the movable part.

24. The apparatus of claim 23, the base comprising a blade for scratching the at least one optical waveguide and clamping jaws, and the movable part comprises an anvil and at least one further clamping jaw.

25. A method for processing at least one optical waveguide, comprising:
providing a cleaved-off part of the at least one optical waveguide in a notch of a lever,
engaging of a projecting part on a hook behind the lever,
sliding of the projecting part along a sliding surface on the lever,
decoupling of the projecting part and the sliding surface,
moving the lever, thus moving the cleaved-off part of the at least one optical waveguide transversely with respect to the longitudinal direction of the cleaved-off part into a container, the container being disposed adjacent to the lever; and
resetting the lever.

26. The method of claim 25, comprising moving a cover, wherein the moving of the cover is caused by the moving of the lever, the cover being disposed on the container.

27. The method of claim 25:
wherein the projecting Dart is a hook and engaging of the hook behind a latch,
sliding of the latch along a sliding surface of the hook,
moving of at least one connection rod in the direction of the lever by the latch,
decoupling of the latch and the sliding surface of the hook, and
resetting of the lever comprises resetting the at least one connection rod and the latch respectively.

28. The method of claim 25, comprising
rotating a first gearwheel,
transmitting of the rotation of the first gearwheel to a rotation of a second gearwheel.

29. The method of claim 25, comprising
moving the lever linear transversely with respect to the longitudinal direction of the optical waveguide.

30. The method of claim 25, inserting the at least one optical waveguide into the notch in the lever, cleaving the at least one optical waveguide such that the cleaved-off part of the at least one optical waveguide results in the notch of the lever.

* * * * *